(12) United States Patent
Noro et al.

(10) Patent No.: US 6,429,283 B2
(45) Date of Patent: Aug. 6, 2002

(54) METHOD OF PRODUCING POWDER

(75) Inventors: Hiroshi Noro; Shigeaki Fujinami; Eiichiro Misaki, all of Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/758,157

(22) Filed: Jan. 12, 2001

(30) Foreign Application Priority Data

Jan. 13, 2000 (JP) ........................................ 2000-004387
Jan. 13, 2000 (JP) ........................................ 2000-004388

(51) Int. Cl.$^7$ .................................................. C08F 6/00
(52) U.S. Cl. ........................................ 528/480; 524/714
(58) Field of Search ........................... 524/714; 528/480

(56) References Cited

U.S. PATENT DOCUMENTS 3,868,265 A * 2/1975 Sakai et al. ................... 117/18

FOREIGN PATENT DOCUMENTS

JP          2669761          8/1994

* cited by examiner

*Primary Examiner*—Terressa M. Boykin
(74) *Attorney, Agent, or Firm*—Birch, Stewart, Kolasch & Birch, LLP

(57) ABSTRACT

The present invention provides a method of producing powder of e.g. a polycarboxylic acid-based copolymer efficiently at a high yield. The method of the present invention comprises forming a sticky thin-film of the polycarboxylic acid-based copolymer or the like on a support, reducing a stickiness of the said thin-film and powdering the said thin-film.

14 Claims, 7 Drawing Sheets

METHOD OF PRODUCING POWDER

TECHNICAL FIELD

The present invention relates to a method of producing powder from a sticky, tacky, adhesive or viscous thin-film.

PRIOR ART

Polymer compounds are substances used frequently in a wide variety of uses but many of them show their stickiness by being heated thus making their conversion into powders difficult. For example, when a substance showing its stickiness at a high temperature is used to produce a powdery product by a spray drying method as one of ordinarily drying methods, there is the problem of attaching (or adhesion) of the sticky substance onto an inside of a spray drying tower thereof, thus making it difficult to produce the powdery product therefrom. To solve this problem, for example, in the case that a polycarboxylic acid copolymer as the substance showing is stickiness at a high temperature is powdered, JP-B 2669761 discloses a method of spray-drying a liquid polycarboxylic acid copolymer and an inorganic powder such as a cement material in order to obtain powder. In this production of powder by such spray drying method, however, it become essential to incorporate a non-sticky substance such as an inorganic powder. Therefore, in order to improve a yield (or recovery ratio) thereof, it become necessary to incorporate a large amount of the non-sticky substance. Variety on a composition thereof is thus limited. Further, this method as a prior art has the problem that when the incorporated amount of the inorganic powder is reduced, the yield of the powder is lowered. With respect to a polymer compound which in a thin-film form does not show its stickiness, there is known a method of drying and powdering a thin-film formed from a solution of the said polymer compound. However this method is limited for the material of which a thin-film by drying becomes flaky actually.

DISCLOSURE OF INVENTION

The object of the present invention is to provide a method of producing powder at a high yield from a sticky thin-film with high variety on a composition thereof without necessitating an incorporation of a non-sticky substance.

The present invention relates to a method of producing powder, which comprises forming a sticky thin-film on a support, reducing a stickiness (tackiness, adhesiveness or viscousness) of the said thin-film and powdering the said thin-film.

The stickiness of the thin-film can be reduced by cooling the thin-film. After stripping (peeling or releasing) the thin-film from the support, a gas stream may be fed (or supplied) to a surface of the thin-film. The thin-film on the support may be heated.

It is preferable that the sticky thin-film contains a polymer compound.

The powder obtained by the method of the present invention can be used as a cement dispersant. The present invention also provides use thereof, a method of dispersing cement and a cement composition comprising the said powder.

The method of the present invention may further comprise a step of processing (or treating) the thin-film by running the thin-film on a surface of a cylinder and pressure-sensitively adhering (or contact-bonding) the thin-film onto the surface of the cylinder by means of an auxiliary roll which changes a size of a clearance (gap or distance) between itself and the cylinder depending on a change in a thickness of the said thin-film. The cylinder may have been heated or cooled. In this manner, the stickiness of the thin-film can regulate and average the thickness thereof.

In the present invention, the "sticky thin-film" is a thin-film having an attaching (adherent or bonding) property even upon application of a slight pressure in a short time. For example, it has a characteristic to adhere onto an another thin-film or the other material (e.g. a constituent member in a device or instrument used in the producing process) if the said thin-film is stripped from the support. The stickiness includes one being exhibited by heating.

The stickiness of the thin-film can be confirmed by, for example, the following manner. If, when parts in the thin-film or the thin-films stripped from a support(s) are brought into contact with each other, both of the parts or thin-films adhere each other, the thin-film is called the sticky thin-film. Alternatively, if, when a thin-film stripped from a support is brought into contact with a member on which the thin-film may be brought into contact during the production, both of the thin-film and the member adhere each other, the thin-film is called the sticky one. In the latter case, if, when the member onto which the thin-film adheres is turned upside down (or turned about), the thin-film does not drop by gravity from the member, the thin-film is judged to be sticky. Because the object toward which the thin-film shows its stickiness is varied depending on a type of the sticky thin-film, it is also preferable that the device or instrument used in the producing process is composed of materials toward which the thin-film does not show the stickiness.

BRIEF DESCRIPTION OF DRAWINGS

In Drawings, 1 and 1' are drums; 2, 2' and 2": scrapers; 3: an aqueous solution of a polycarboxylic acid copolymer; 4: a disk; 5: a guiding plate; 6: a cooling drum; 11: a cylinder; 12: an auxiliary roll; 13 and 13': supporting means for an auxiliary roll; 14: a thin-film; 15: a bearing; and 16: an elastic member.

DETAILED DESCRIPTION OF THE INVENTION

According to the method of the present invention, there can be carried out a formation of a sticky thin-film, a stripping of the said thin-film, a cooling of the stripped product, a pulverizing grinding, shattering, smashing, breaking or crushing) of the cooled product, a classification of the pulverized product, or the like. These can be carried out continuously (consecutively or successively).

In the present invention, the formation of the sticky thin-film on a support is preferably carried out by a conductive heat-drying method. The conductive heat-drying method can be carried out with a publicly known conductive heating dryer such as a drum dryer (being available from Katsuragi Industry Kogyo Co., Ltd., Kusuki Kikai Ltd., Tamagawa Machinery Co., Ltd., etc.), a CD dryer (being available from Nishimura Tekkosho Co., Ltd.), etc. These supply and attach a liquid onto a surface of the drum in a cylindrical form or the disk to form a thin-film and dry the thin-film by a heat conduction from a heat source. The thickness of the sticky thin-film (or an applied thickness thereof) is determined in consideration of a solid content of the liquid to be applied, a process-ability of the dryer, a rate of drying, a state (or form) of the thin-film, or the like. Then, the thickness is preferably 0.001 to 3 mm and more preferably 0.01 to 2 mm. Once the thin-film is formed to dry itself, it can be quickly (rapidly, fast, swiftly or speedily) dried. Therefore a heat deterioration or the like hardly arises (happens or takes place), so that there is no or less copolymer failing to demonstrate a performance as a merchandise. The temperature of the source to heat for drying is preferably 50 to 200° C. and more preferably 50 to 160° C. under a normal pressure. In other words, the temperature of the sticky thin-film is preferably 50 to 200° C. and more preferably 50 to 160° C. In order to dry efficiently at a lower temperature of the source to heat, the thin-film may be dried under a reduced pressure.

The sticky thin-film is stripped with a stripping means such as a scraper made of metal, for example. The means equipped in a publicly known dryer for the thin-film may be used as the stripping means. As the stripping means may be used the scraper made of stainless steel of which a surface is treated with a treating agent such as Teflon so as to reduce its stickiness toward the sticky thin-film, for example. The stripping means is preferably installed in a place where the sticky thin-film and the stripped thin-film do not adhere to the stripping means and the support. Further, the stripping means is preferably installed in a place where the stripped thin-films do not adhere to one another. It is preferable that 70 to 100 parts by weight among 100 parts by weight of the sticky thin-film on the support can be stripped and it is more preferable that 90 to 100 parts by weight thereof can be stripped.

In the present invention, it is preferable that, while the sticky thin-film is prevented from being overlapped (piled or stacked), the said thin-film is stripped from the above-mentioned support. For example, if the sticky thin-film is formed by means of a drum dryer or a disk dryer, overlapping (convolution or superimposing) of parts in the thin-film can be prevented each other by jetting a gas stream, preferably air stream, onto the surface of the thin-film. Further, overlapping of parts in the thin-film can be prevented each other by installing a guiding plate of which the surface is treated with Teflon or the like to reduce its stickiness toward the sticky thin-film or by combination of jetting a gas stream with installing the guiding plate. A shape of the guiding plate can be suitably designed depending on a shape of the support. For example, when a cylindrical support such as a drum dryer is used, the guiding plate may have the same length (or size) as that of the said support in a longer direction thereof, and a thickness of the guiding plate and a length in a shorter direction thereof are not particularly limited. These embodiments are described by reference to the drawings.

Figure 1:
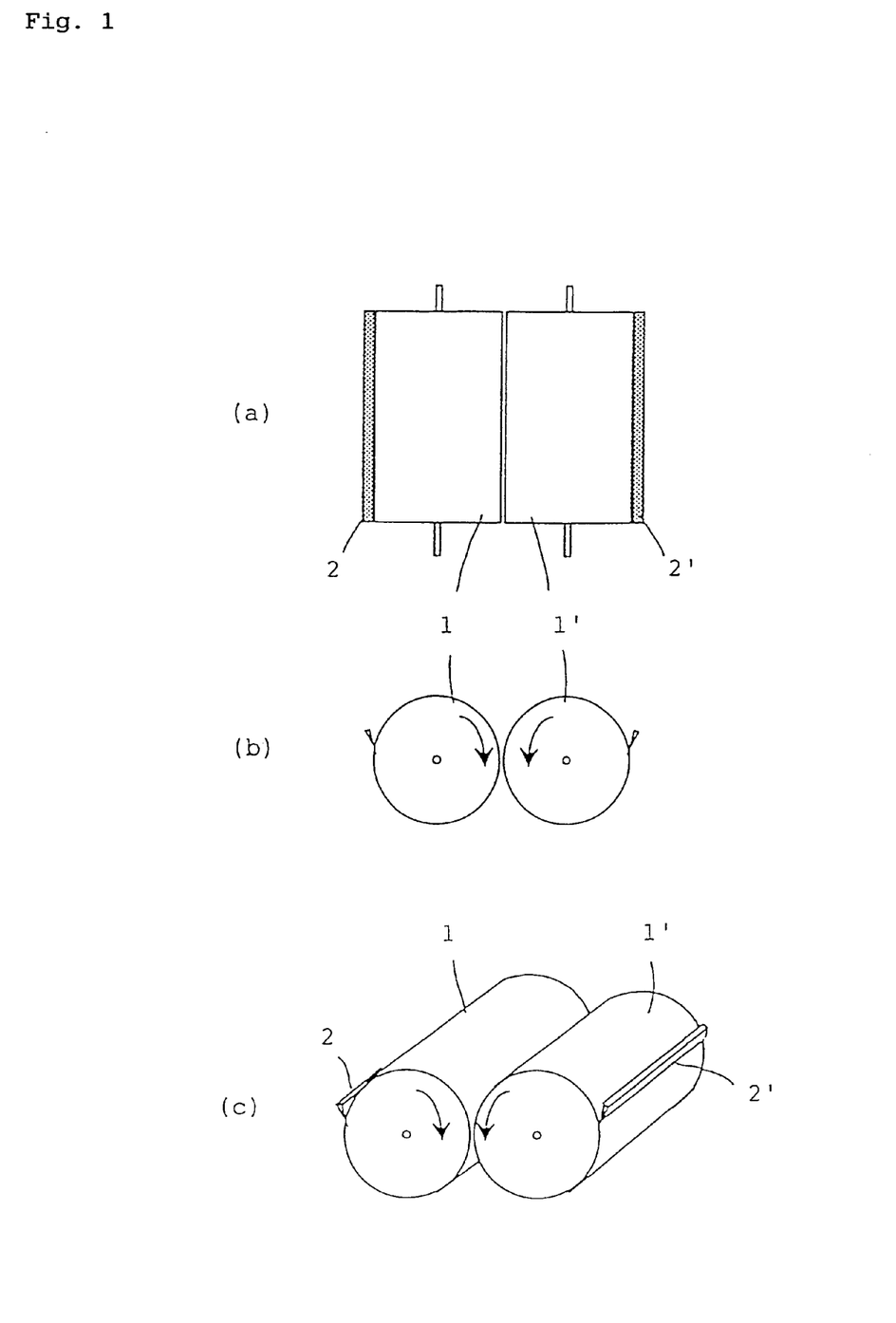
FIG. 1 is an outline of a feature showing an example of a drum dryer (or dehydrator) used in the present invention.
Figure 2:
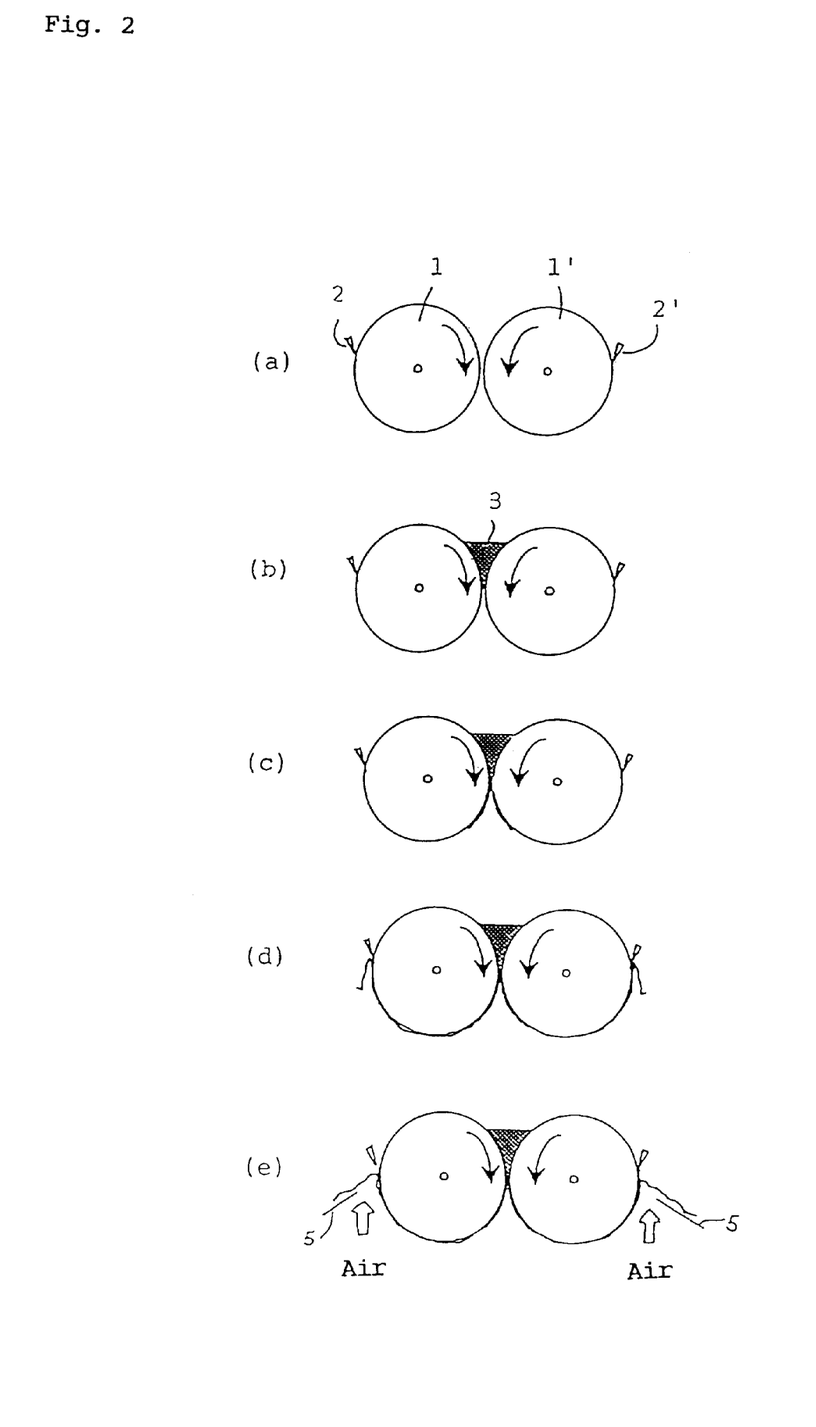
FIG. 2 is an outline showing a formation and stripping of a sticky thin-film by the drum dryer in FIG. 1.

FIG. 1 is an outline of a feature showing a drum dryer, and FIG. 1(a) is a drawing viewed from a plane thereof, (b) from a front (or face) thereof, and (c) in an oblique (or perspective) direction. In this device, the rotative drums 1 and 1' are installed to form a clearance of about 0.001 to 5 mm therebetween. Further, surfaces of the drums 1 and 1' can be heated to a temperature of 50 to 200 ° C. by introduction (or injection) of steam etc. thereinto. The scrapers 2 and 2' are installed near the drums. FIG. 2 is an outline showing a formation and stripping of the sticky thin-film with the device. In FIG. 2(a), the surfaces of the drums 1 and 1' are first heated to a temperature of 50 to 200° C. by introduction of steam etc. into the drums while the drums 1 and 1' are rotated in the opposite direction each other. Then, a starting (or raw) material of the sticky thin-film in a liquid form, for example the aqueous solution of the polycarboxylic acid polymer 3, is fed between the drums 1 and 1' as shown in FIG. 2(b). The aqueous solution 3 is discharged from the clearance of the drums 1 and 1' with rotating of the drums and formed by heating into thin-films on the surface of the drums 1 and 1' during the discharge [FIG. 2(c)]. The said thin-films are moved (transferred or dislocated) by the rotating drums 1 and 1' and stripped by the scrapers 2 and 2' installed halfway. Usually, the thin-film has its very high stickiness so that, with only the scraper, the stripped product may be overlapped to form a mass in some cases and the mass may stays (or accumulates) there. Accordingly, overlapping of the thin-film is prevented in this device by jetting a gas stream, preferably air stream, onto the surface of the thin-film in the side where the drums 1 and 1' are not contacted. At this time, it is preferable that the guiding plates 5 are arranged in the side where the drums 1 and 1' are not contacted [FIG. 2(e)]. In this case, the gas stream is jetted between the drum 1 and/or 1' and the guiding plate 5. The jetting degree of the gas stream may be regulated depending on a physical property of the thin-film and the state of the thin-film desired to be produced. To produce e.g. a breakage-free thin-film (or a thin-film having no break), a uniform jetting at a low pressure is preferable. The gas stream can be jetted by means of a publicly known jetting member such as a nozzle for jetting a gas stream at the desired degree of jetting. The guiding plates 5 may be omitted. In the present invention, the single drum-type device using such a drum alone may also be used.

Figure 3:
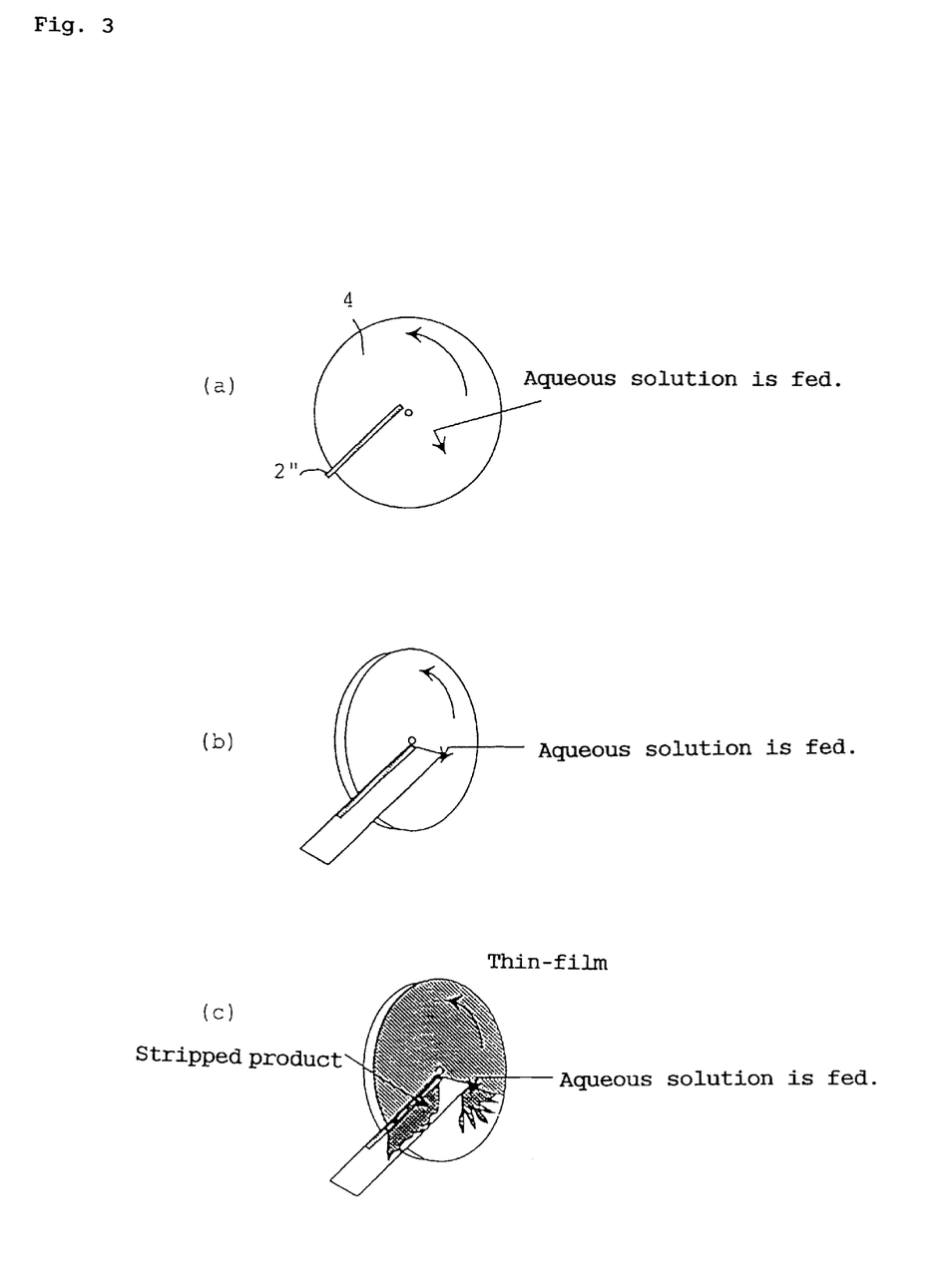
FIG. 3 is an outline of a feature showing an example of a disk part in a disk dryer used in the present invention.
Figure 4:
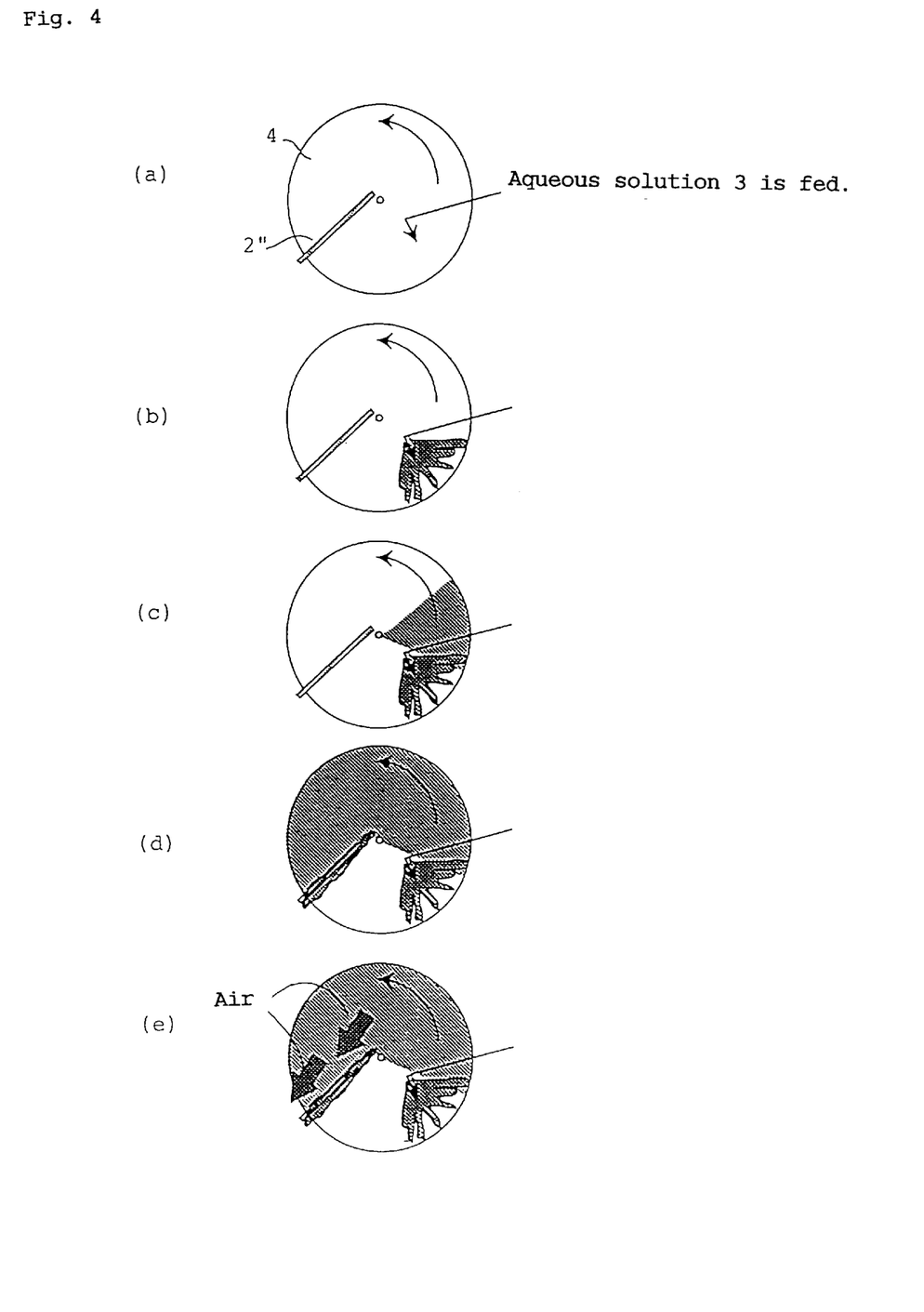
FIG. 4 is an outline showing the formation and stripping the sticky thin-film by the disk dryer in FIG. 3.

Next, the formation and stripping of the sticky thin-film by the disk dryer are described by reference to FIG. 3. FIGS. 3(a), (b) and (c) are an outline of the disk 4 installed with the scraper 2". Such plural disks are used in usual. The surface of the disk 4 can be heated to a temperature of 50 to 200° C. by introduction of steam etc. into the disk. FIG. 4 is an outline showing the formation and stripping of the sticky thin-film by use of this device and shows steps with one disk for convenience's sake. Firstly, the surface of the disk 4 is heated to a temperature of 50 to 200° C. by introduction of steam etc. into the disk 4 with rotating the disk 4 [FIG. 4(a)]. Next, a liquid polycarboxylic acid-based copolymer, for example the aqueous solution of the polycarboxylic acid copolymer 3, is fed to the surface of the disk as shown in FIG. 4(b). The aqueous solution 3 having adhered to the surface of the disk 4 is transferred upward in the drawing by the rotating disk 4, [FIG. 4(c)] during the time when the solution is formed into a thin-film by gravity and centrifugal force. Then, the thin-film is dried to be sticky. The said thin-film is further transferred by the rotating disk 4 and stripped by the scraper 2" installed halfway [FIG. 4(d)]. In this device too, the thin-film is stripped while an overlapping thereof is prevented by jetting a gas stream, preferably air stream, onto the surface of the thin-film in the side where it does not contact with the disk 4 [FIG. 4(e)] as is the case with the drum dryer.

Then, the stripped product is powdered. In the case of the conductive heat-drying method, the stripped product is in a heated state and often shows stickiness. Accordingly, the stripped product is cooled to reduce the stickiness, thus facilitating a handling thereof. This cooling is preferably carried out immediately after the stripping. Specifically, a publicly known batch- or continuous-type cooler, preferably a continuous-type one, can be used for the cooling. Such a device includes e.g. a tray-type cooler, a belt cooler, a drum cooler, a fluidized bed etc. In the case of the drum cooler, it is preferable for raising a thermal efficiency that the stripped product is transported in the thin-film form up to the drum and allowed to adhere to the surface of the cooling drum. In the case of the fluidized bed, the cooling and powdering can be carried out in a series of procedures by jetting e.g. a cooling air onto the stripped product.

For successively carrying out the application, stripping and cooling of the thin-film is mentioned a method of floating the stripped product showing its stickiness by an air slider to transport it to the cooler, a method of transporting the stripped product by using gravity-drop to the cooler with regulating the position of the installed stripping means, a method of transporting the stripped product to the cooler by installing a chute to which the product does not adhere, and the like.

The stripped product can be powdered by pulverizing (milling, grinding, crushing or disintegrating) itself into powder, granules, thin-films, flakes, etc. Pulverizing of the stripped product can be carried out in a pulverizer (mill, grinder, crusher or disintegrator) such as an ACM pulverizer (Hosokawa Micron Corp.), a turbo mill (Turbo Kogyo Co. Ltd.), a Fits mill (Hosokawa Micron Corp.), a roll granulator (Nippon Granulator Co. Ltd.), etc. For pulverizing, it is preferable to prevent adhesion of the powder to the inside of the pulverizer. As a method of preventing the adhesion, removing a heat of pulverizing by introducing a cooling air or the like is also effective. The temperature of the cooling air may be properly selected depending on the generated amount of the heat of pulverizing but, from the view point of saving energy, is more than enough to be the necessary minimum temperature. The amount of moisture (or water) contained in the powder is preferably 20% by weight or less, more preferably 10% by weight or less, and most preferably 5% by weight or less.

Figure 5:
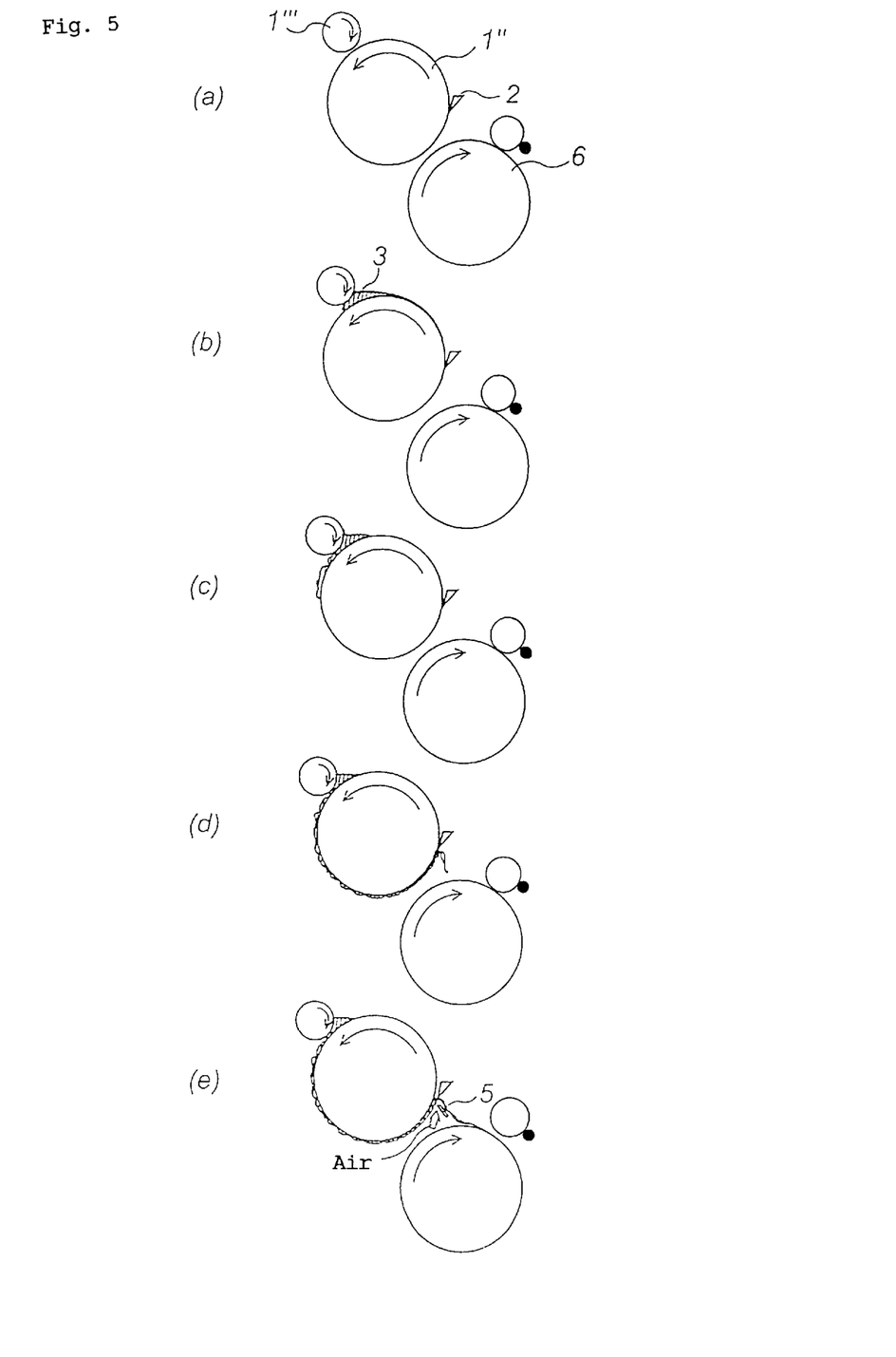
FIG. 5 is an outline showing a formation and stripping of a sticky thin-film by a device with a single drum dryer.
Figure 6:
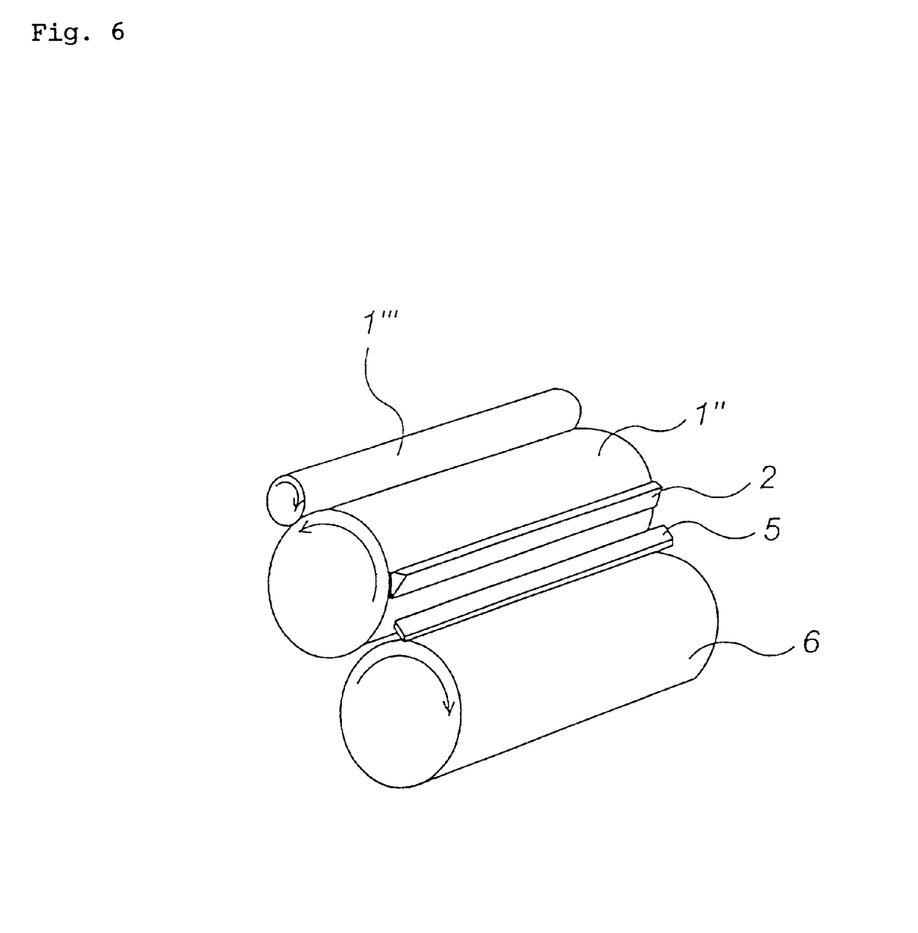
FIG. 6 is a perspective outline of the device used in FIG. 5.

Further, the formation and stripping of the sticky thin-film by the single drum dryer is described by reference to FIG. 5. FIG. 5 is an outline of a device comprising a combination of the auxiliary drum 1''', the drum 1'' and the cooling drum 6. FIG. 6 is a perspective outline of the device used in FIG. 5. A surface of the drum 1'' is heated to a temperature of e.g. 50 to 200° C. by introduction of steam etc. thereinto. A surface of the cooling drum 6 is cooled by introduction of cooling water etc. thereinto. While the auxiliary drum 1''' and the drum 1'' are rotated in the opposite direction each other, the starting material 3 of the sticky thin-film in a liquid form is fed between the drums 1'' and 1''' [FIGS. 5(a) and (b)]. The starting material 3 is discharged from the clearance of the drums 1'' and 1''' with rotating of the drums and formed by heating into a thin-film on the surface of the drum 1'' during the discharge [FIG. 5(c)]. The said thin-film is transferred by the rotating drum 1'' and stripped by the scraper 2 installed halfway [FIG. 5(d)]. The stripped thin-film is guided to the cooling drum 6 and, as shown in FIG. 5(e), overlapping of parts in the thin-film is preferably prevented by installing the guiding plate 5 and further by jetting air onto the surface of the stripped thin-film. Installation of the guiding plate and jetting of air can also be omitted. As the cooling advances, the thin-film on the cooling drum is often powdered, but the pulverizing processing described above may also be carried out as necessary.

As described above, it is preferable in the method of the present invention that the sticky thin-film is formed on the support, the said thin-film is stripped from the support, then the stripped thin-film is cooled to reduce its stickiness, and the said thin-film is further powdered.

The sticky thin-film in the present invention includes one containing a polymer compound having its softening point such as a polysulfonic acid copolymer and a polycarboxylic acid-based copolymer. The polycarboxylic acid-based copolymer includes a copolymer of at least one monomer ① selected from the group consisting of acrylic acid, methacrylic acid, crotonic acid, maleic anhydride, maleic acid, itaconic anhydride, itaconic acid, citraconic anhydride, citraconic acid, fumaric acid, allyl sulfonic acid and methallyl sulfonic acid, and an alkali metal salt, alkaline earth metal salt, ammonium salt and amine, salt thereof; and at least one monomer ② selected from the group consisting of a polyalkylene oxide having 2 to 2000 moles on average of alkylene oxide polymerized with the said monomer ① and a terminal ester compound thereof. The alkylene oxide of the monomer ② includes ethylene oxide and propylene oxide which have the average number of added moles of 2 to 300 and preferably 100 to 300. As described above, one in a liquid form can be used in the present invention. For example, the polycarboxylic acid-based copolymer in a liquid form includes an aqueous solution, a solution in an organic solvent or the like, a dispersion and a melt of the polycarboxylic acid-based copolymer. For the dispersibility and dispersion retention for use as a cement dispersant, it is preferable that the weight average molecular weight (gel permeation chromatography, converted to polystyrene sulfonic acid) of the polycarboxylic acid-based copolymer used in the present invention is 3,000 to 1,000,000 and particularly 5,000 to 100,000.

As the starting material of the sticky thin-film, one which is blended with at least one starting material by a chemical or physical means can be used. For instance, it can be produced by a technique such as a solvent polymerization described in JP-A 59-162163, JP-B 2-11542, JP-B 2-7901, JP-B 2-7897, JP-A 7-223852 etc.

The polymer compound having its softening point can be formed into a thin-film by the conductive heat-drying method, if necessary using a solvent or the like together. However, the thin-film just after stripping is usually in a heated state and shows its strong stickiness thus making a handling thereof after the stripping troublesome, so that it is preferable for obtaining powder efficiently from the polymer compound while overlapping of the sticky thin-film is prevented by jetting a gas stream as described above, the said sticky thin-film is stripped from the support, for example. The stripping, cooling and drying of the sticky thin-film can be smoothly advanced thereby to produce powder easily. The present invention is preferably suitable as a producing method which comprises powdering a polycarboxylic acid-based copolymer showing its strong stickiness in a thin-film form, particularly in a heated state.

EMBODIMENT 1

<Aqueous Solution of a Polycarboxylic Acid-Based Copolymer>

According to Production Example 1 in column 6 in JP-A 7-223852, an aqueous solution of a polycarboxylic acid-based copolymer with a solid content of 40% was produced and used in Examples and Comparative Examples mentioned below.

EXAMPLE 1

As the dryer, a double drum dryer (Tamagawa Machinery Co., Ltd) was used by inboard turning drums thereof. The aqueous solution of the polycarboxylic acid-based copolymer was fed between the drums at 10 kg/hr and calender-molded (or roll-molded) with the clearance between the drums in order to form a 0.2-mm thin-film on the surface of each of the drums (at a temperature of 130° C.). The formed thin-film was scratched by the scraper and then transported with an installed chute of which a surface had been treated (or processed) with Teflon to prevent adhesion of the dried product thereto. The thin-film was calendered and cooled with a double drum cooler to prepare powder. At stripping the thin-film with the scraper in this example, air (10° C.) was jetted onto the surface of the thin-film in the side where the drums were not contacted with each other. The obtained powder was pulverized into one having an average particle diameter of 200 µm by a turbo mill (Turbo Kogyo Co. Ltd.).

EXAMPLE 2

As the dryer, a double drum dryer (Kusuki Kikai Ltd.) was used by inboard turning drums thereof. The aqueous solution of the polycarboxylic acid-based copolymer was fed between the drums at 30 kg/hr and calender-molded with the clearance between the drums in order to form a 0.3-mm thin-film on the surface of each of the drums (at a temperature of 130° C.). The formed thin-film was scratched by a scraper, then transported with an air slider and introduced (or threw)/cooled in a belt cooler to prepare powder. At stripping the thin-film with the scraper in this example, air (15° C.) was jetted onto the surface of the thin-film in the side where the drums were not contacted with each other. For preventing the thin-film from adhering onto the air slider, the surface of the scraper was treated with Teflon to be used in this example. The obtained powder was pulverized into one having an average particle diameter of 150 µm by a Fits mill (Hosokawa Micron Corp.).

EXAMPLE 3

As the dryer, a top feed-type single-drum dryer (Katsuragi Industry Co., Ltd.) was used. The aqueous solution of the polycarboxylic acid-based copolymer was fed between a heating drum and a feeding roller at 5 kg/hr and calender-molded with the clearance between the drums in order to form a 0.1-mm thin-film on the surface of the heating drum (at a temperature of 130° C.). The formed thin-film was scratched by the scraper, then dropped by gravity, and cooled in a single drum with being pressure-sensitively adhered with the auxiliary roll in order to prepare powder. Here, the scraper was installed below a position in a horizontal direction having a center as the rotating shaft of the drum. The obtained powder was pulverized into one having an average particle diameter of 200 µm by a Fits mill (Hosokawa Micron Corp.).

EXAMPLE 4

As the dryer, a CD dryer (Nishimura Tekkosho Co., Ltd.) was used, and the aqueous solution of the polycarboxylic acid-based copolymer was fed thereto at 25 kg/hr, then formed into a thin-film on the surface of the disk at a temperature 130° C., scratched by the scraper and then cooled with a double drum in order to prepare powder. The obtained powder was pulverized into one having an average particle diameter of 50 µm by an ACM pulverizer mill (Hosokawa Micron Corp.).

EXAMPLES 5 TO 7

The same procedure as in Example 1, 2 or 3 was carried out except that no pulverizing was carried out in each of all procedures.

EXAMPLE 8

The same procedure as in Example 1 was carried out except that, as the aqueous solution of the polycarboxylic acid-based copolymer, a regulated liquid comprising the aqueous solution of a polycarboxylic acid-based copolymer in Reference Example and a blast furnace slag (with an average particle diameter of 1 µm as determined by a gas absorption method) at a ratio of 100 : 100 by weight in terms of solid content was used.

COMPARATIVE EXAMPLE 1

The aqueous solution of the polycarboxylic acid-based copolymer was dried with a spray dryer to prepare powder. Using the spray dryer as the dryer, the liquid polycarboxylic acid-based copolymer was fed at 25 kg/hr and dried at a temperature of 130° C. of a hot air at an inlet in the spray dryer.

COMPARATIVE EXAMPLE 2

Powder was obtained in the same manner as in Comparative Example 1 except that the same mixed liquid of the aqueous solution of the polycarboxylic acid-based copolymer and the blast furnace slag as in Example 8 was used.

<Evaluation>

A residual degree in the dryer and a yield of the powder are measured. The results are shown in a table. The residual degree in the dryer and the yield of the powder were determined by measuring the weight of each thereof and calculated in % by weight.

TABLE 1

|  | Dryer | Pulverizing | Ratio by weight of solid content in aqueous solution | | Residual degree in the dryer | Yield of the powder |
| --- | --- | --- | --- | --- | --- | --- |
|  |  |  | Polycarboxylic acid | Inorganic powder |  |  |
| Example |  |  |  |  |  |  |
| 1 | Drum dryer | Exist | 100% | 0% | 0% | 100% |
| 2 | Drum dryer | Exist | 100% | 0% | 0% | 100% |
| 3 | Drum dryer | Exist | 100% | 0% | 0% | 100% |
| 4 | CD dryer | Exist | 100% | 0% | 0% | 100% |
| 5 | Drum dryer | None | 100% | 0% | 0% | 100% |
| 6 | Drum dryer | None | 100% | 0% | 0% | 100% |
| 7 | Drum dryer | None | 100% | 0% | 0% | 100% |
| 8 | Drum dryer | Exist | 50% | 50% | 0% | 100% |
| Comparative Example |  |  |  |  |  |  |
| 1 | Spray dryer | None | 100% | 0% | 30% | 70% |
| 2 | Spray dryer | None | 50% | 50% | 20% | 80% |

As is evident from Table 1, the powder of the polycarboxylic acid-based copolymer can be produced efficiently at a high yield and variety on a composition thereof is high in the method of the present invention as compared with that of Comparative Examples.

EMBODIMENT 2

In the producing method of the present invention, the thin-film can be processed by the cylinder and the auxiliary roll as described above. Hereinafter, this embodiment is described.

The present invention relates to a device for heating a thin-film, which comprises a means supplying the thin-film, a cylinder running the thin-film and being equipped with a heating means, and an auxiliary roll in contact with the thin-film on the said cylinder, wherein a size of a clearance formed by the above-mentioned cylinder and the above-mentioned auxiliary roll is changed depending on a change in a thickness of the thin-film.

Further, the present invention relates to a device for cooling a thin-film, which comprises a means supplying the thin-film, a cylinder running the thin-film and being equipped with a cooling means, and an auxiliary roll in contact with the thin-film on the said cylinder, wherein a size of a clearance formed by the above-mentioned cylinder and the above-mentioned auxiliary roll is changed depending on a change in a thickness of the thin-film.

Further, the present invention relates to a method of heating a thin-film, which comprises running the thin-film on a surface of a heated cylinder and then pressure-sensitively adhering the above mentioned thin-film onto the above-mentioned surface of the cylinder by an auxiliary roll which, depending on a change in a thickness of the said thin-film, changes a size of a clearance between itself and the cylinder.

Further, the present invention relates to a method of cooling a thin-film, which comprises running the thin-film on a surface of a cooled cylinder and then pressure-sensitively adhering the above-mentioned thin-film onto the above-mentioned surface of the cylinder by an auxiliary roll which, depending on a change in a thickness of the said thin-film, changes a size of a clearance between itself and the cylinder.

The device of the present invention is preferably suitably used for a thin-film having a relative stickiness toward a cylinder, and not closely adhering toward the cylinder without a treatment, but closely adhering toward the cylinder under pressurization. Further, the method of the present invention is preferably suitably used for a thin-film having a relative stickiness toward a cylinder, and not closely adhering the cylinder without a treatment, but closely adhering toward the cylinder under pressurization.

A feature of the device in this embodiment is described by reference to the drawing.

Figure 7:
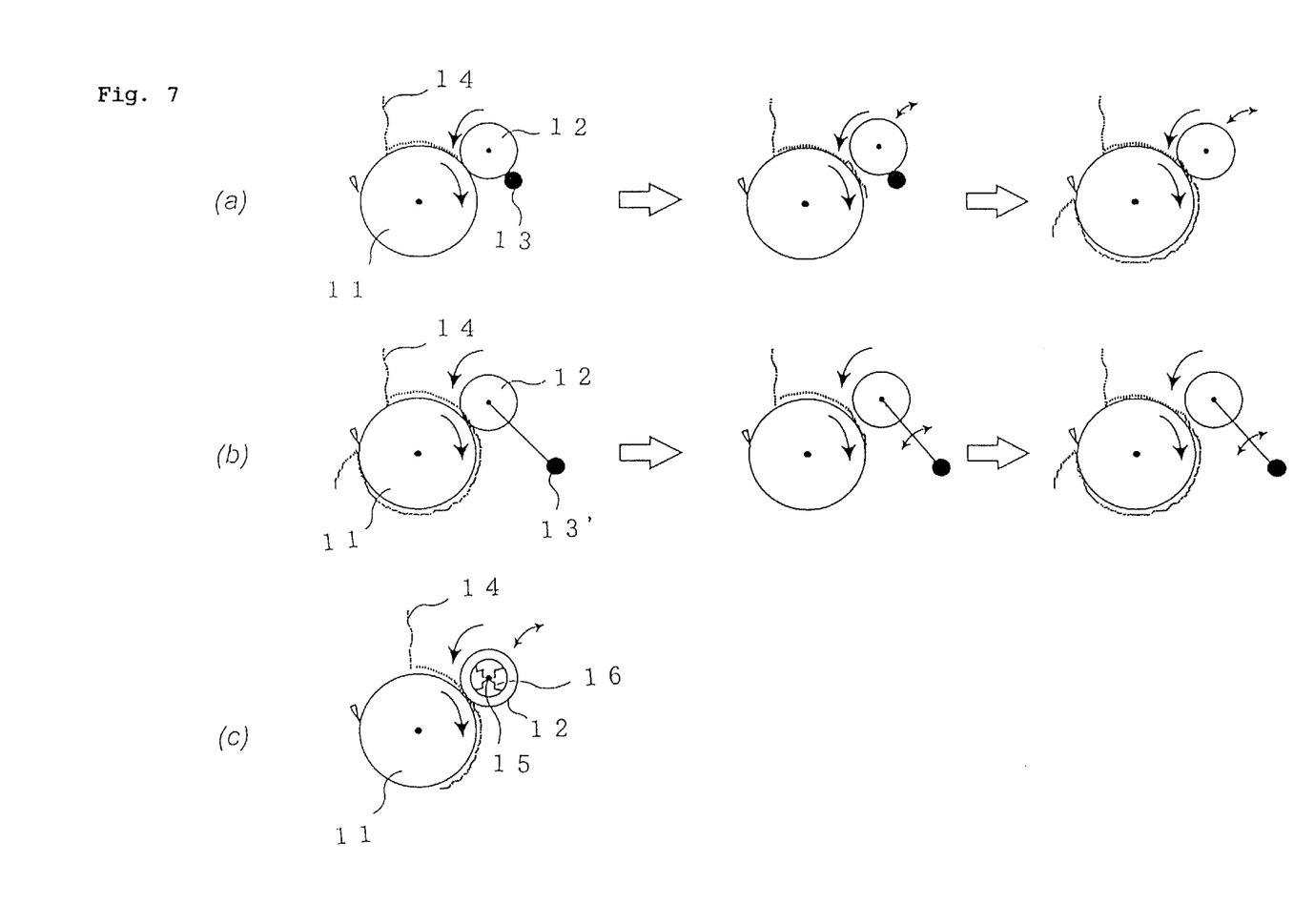
FIG. 7 is an outline of a feature showing an example of a device including an auxiliary roll for a pressure-sensitively adhering in the present invention.

The device in FIG. 7(a) has the rotative cylinder 11 running a thin-film and being quipped with a heating or cooling means (not shown), and the auxiliary roll 12 in contact with the thin-film running on a surface of the said cylinder 11. The auxiliary roll 12 is installed between the cylinder 11 and the supporting means 13. The said auxiliary roll 12 is rotated by a friction with the thin-film 14 as the cylinder 11 rotates. At this time, the auxiliary roll 12 has no fixed shaft and is supported by only two positions as the cylinder 11 and the supporting means 13, so that the roll 12 can move depending on a change in a thickness of the thin-film, thus being able to change a size of a clearance between itself and the cylinder 11. The supporting means 13 preferably has a shape so that a line or plural points thereof are contacted with the auxiliary roll 12. The means 13 is preferably one which has less friction against the auxiliary roll 12, such as a bar, and more preferably a fixed one as it is. By such the movement (transfer or dislocation) of the auxiliary roll 12, its weight is more effectively transmitted to the thin-film 14 thereby improving (increasing or heightening) a close adhesion of the thin-film onto the surface of the cylinder 11. Depending on the physical property of the thin-film, the pressure from the auxiliary roll 12 may be suitably changed by the weight, a diameter, an installed position thereof etc. A contacted area between the auxiliary roll 12 and the cylinder 11 and a force of a vector component thereof on the cylinder 11 can be calculated from the diameter and position of the auxiliary roll 12. Further, a size and material of the cylinder 11 and the auxiliary roll 12 may be suitably selected depending on the thin-film.

In the device in FIG. 7(b), a supporting means 13' comprises a bearing penetrating the auxiliary roll 12 and a supporting bar extending from an end thereof. In this device, the auxiliary roll 12 is brought, in a roller form, into contact with the thin-film on the cylinder 11. In this device, the auxiliary roll 12 has a penetration hole for passing the-bearing therethrough and this penetration hole is formed with a larger diameter than that of the bearing so as to generate a play (or an odd place) around the bearing. By this constitution and an elasticity of the supporting bar, the said auxiliary roll 12 can be dislocated depending on the change in the thickness of the thin-film 14, as is the case with the device in FIG. 7(a).

The device in FIG. 7(c) is arranged with the elastic member 16 (preferably a spring) between the bearing 15 and the auxiliary roll 12. When the thin-film is fed onto the cylinder 11 in this device, the auxiliary roll 12 is dislocated depending on the change in the thickness of the thin-film by a force of the elastic member 16, whereby the size of the clearance between the auxiliary roll 12 and the cylinder 11 is changed to make the low-sticky thin-film 14 be pressure-sensitively adhered onto the cylinder 11 suitably. This device is preferable since the auxiliary roll 12 can be arranged in any position toward the cylinder 11 to increase variety on designing the device and to improve an effect of the pressure-sensitively adhering. In the device of the present invention, two or more auxiliary rolls can be installed to effect a multistage pressure-sensitively adhering. In this case, each of the auxiliary rolls can be utilized in any method shown in FIGS. 7(a) to (c) etc.

Insofar as the size of the clearance formed between the cylinder and the auxiliary roll in the present device of the present invention can be changed depending on the change in the thickness of the thin-film, the auxiliary roll may be installed in any form besides those described above; for example, the auxiliary roll may be suspended.

The conventional device cannot deal with the change in the thickness of the thin-film because its auxiliary roll is supported by a fixed shaft to make the size of the clearance between itself and the cylinder constant. Accordingly, there arises a problem that if the thickness of the thin-film is not less than the size of the clearance, a clogging occurs and the thin-film is calendered. While, there arises another problem that if the thickness of the thin-film is not more than the size of the clearance, the thin-film cannot be sufficiently pressure-sensitively adhered thereto, thus lowering adhesion therebetween to reduce a thermal efficiency. In the device of the present invention, on the other hand, the size of the clearance formed by the cylinder and the auxiliary roll can be varied depending on the change in the thickness of the thin-film so that, even if the thickness of the thin-film is changed, the thin-film can be pressure-sensitively adhered onto the cylinder by the auxiliary roll in the proper way and thus the thermal efficiency does not change.

In the device of the present invention, it is preferable for the thermal efficiency that the surface of the auxiliary roll is made of a material to which the low-sticky thin-film does not adhere or hardly adheres and/or that the surface has a structure being capable of reducing adhesion thereof. For example, it is mentioned that the surface is treated with a fluorine resin, satinizing, etc.

The thin-film can be produced by the conductive heating dryer described above for the formation of the sticky thin-film on the support, and the thin-film can be obtained by the proper stripping means described above for stripping the sticky thin-film, and the resultant thin-film may be fed to the cylinder in the device of the present invention. At that time, the means of feeding the thin-film to the cylinder includes a single or plural carrying rolls, etc. The device may have a structure in which the starting material of the thin-film in a molten state is fed to the cylinder in order to form the thin-film and the thin-film is then cooled as such. The device having the structure is, for example, a publicly known flaker device.

The device of the preset invention may be equipped with an element, as known in public, used in the drum dryer or drum cooler such as a means of stripping the heated or cooled thin-film, a means of pulverizing the stripped thin-film, and a means of transporting the stripped thin-film or a pulverized product.

Examples of compounds formed into the thin-film include a compound having its stickiness and being used in the sticky thin-film described above. For producing the thin-film, a liquid starting material of the thin-film can be used and, for example, the liquid mentioned above can be used.

The starting material of the thin-film can be produced by the method described above for the starting material of the sticky thin-film.

EXAMPLE 9

A 40% aqueous solution of a polycarboxylic acid-based copolymer (with an average molecular weight of 50,000; a monomer ratio: methanol (with an average number of added moles of ethylene oxide of 120) adduct.methacrylate/sodium methacrylate=10/90) was fed to a single drum dryer (having a diameter of 400 mm, a length of 500 mm, a heat transferred area of 0.75 mm$^2$ and a surface plated with hard chromium), allowed to adhere in a thin-film form to the surface of the drum and dried by a heating steam at 130° C., in order to prepare a low-sticky thin-film continuously. The thin-film was stripped therefrom, fed to the same single-drum dryer (with a rotative speed of the cylinder of 10 rpm) and cooled by cooling water at 20° C. In this time, each of the devices described below was used and a cooling effect or the like was evaluated. The temperature at feeding of the thin-film was initiated at 60° C.

① Device A

An auxiliary roll (having a diameter of 50 mm, a length of 500 mm and a surface coated with Teflon) was installed as shown in FIG. 7(a). As the result, the thin-film was cooled to 25° C. while maintaining a thickness thereof without any troubles.

② Device B

An auxiliary roll (having a diameter of 50 mm, a length of 500 mm and a surface coated with Teflon) was installed as shown in FIG. 7(b). As the result, the thin-film was cooled to 25° C. while maintaining a thickness thereof without any troubles.

③ Device C

An auxiliary roll (having a diameter of 100 mm, a length of 500 mm and a surface coated with Teflon) was installed as shown in FIG. 7(c). As the result, the thin-film was cooled to 25° C. while maintaining a thickness thereof without any troubles.

④ Device D

Two auxiliary rolls (of which each has a diameter of 50 mm, a length of 500 mm, a surface coated with Teflon) were installed as shown in FIG. 7(c). As the result, the thin-film was cooled to 23° C. while maintaining a thickness thereof without any troubles.

⑤ Device E

An auxiliary roll (having a diameter of 50 mm, a length of 500 mm and a surface coated with Teflon) was installed as shown in FIG. 7(a) and further an auxiliary roll (having a diameter of 50 mm, a length of 500 mm and a surface coated with Teflon) as shown in FIG. 7(c) was installed downstream in a rotative direction of the cylinder. As the result, the thin-film was cooled to 23° C. while maintaining a thickness thereof without any troubles.

⑥ Device F

In FIG. 7(a), the auxiliary roll was not installed. As the result, the thin-film was neither well sensitively-adhered onto the cylinder nor cooled.

⑦ Device G

In FIG. 7(a), the auxiliary roll was installed with a fixed shaft such that the clearance became less than the thickness of the thin-film. As the result, the thin-film was calendered thus failing to maintain the original thickness and could not be cooled to less than 35° C.

⑧ Device H

In FIG. 7(a), the auxiliary roll was installed with a fixed shaft such that the clearance became more than the thickness of the thin-film. As the result, the thin-film was not pressure-sensitively adhered onto the cylinder and could not be cooled to less than 40° C.

What is claimed is:

1. A method of producing a powder, said method comprising the steps of:

applying a liquid having a solids content to a rotating surface of a support, heating the liquid on the rotating surface of the support to dry the liquid and produce a sticky thin film, removing the sticky thin film from the rotating surface of the support, reducing the stickiness of the removed sticky thin film, and pulverizing the sticky thin film having the reduced stickiness.

2. The method of claim 1, wherein the liquid contains a polymer compound.

3. The method according to claim 2, wherein said polymer compound is a copolymer of at least one monomer (a) selected from the group consisting of acrylic acid, methacrylic acid, crotonic acid, maleic anhydride, maleic acid, itaconic anhydride, itaconic acid, citraconic anhydride, citraconic acid, fumaric acid, allyl sulfonic acid and methallyl sulfonic acid, and an alkali metal salt, alkaline earth metal salt, ammonium salt and amine salt thereof, and at least one monomer (b) selected from the group consisting of polyalkylene oxide having 2 to 2000 moles on average of alkylene oxide polymerized with the said monomer (a) and a terminal ester compound thereof.

4. The method of claim 1, wherein the rotating surface of support is a rotating surface of a drum dryer or a disk dryer.

5. The method of claim 1, wherein the rotating surface of the support is heated to a temperature of from 50 to 200°C.

6. The method of claim 1, wherein the sticky thin-film is removed from the rotating surface of the support by stripping.

7. The method of claim 1, wherein the stickiness of the removed sticky thin film is reduced by cooling the removed sticky thin film.

8. The method of claim 6, wherein the stickiness of the removed sticky thin film is reduced by cooling the removed sticky thin film.

9. The method as claimed in claim 1, wherein the stickiness of the removed sticky thin film is reduced by cooling the removed sticky thin film with a gas stream fed to a surface of the removed sticky thin film.

10. The method as claimed in claim 6, wherein the stickiness of the removed sticky thin film is reduced by cooling the removed sticky thin film with a gas stream fed to a surface of the removed sticky thin film.

11. The method of claim 1, wherein the sticky thin film having the reduced stickiness is pulverized to a powder in a process comprising milling, grinding, crushing or disintegrating.

12. The method of claim 1, wherein the powder is a cement dispersant.

13. A method of producing a powder, said method comprising the steps of:

applying a liquid having a solids content to a rotating surface of a support, heating the liquid on the rotating surface of the support to dry the liquid and produce a sticky thin film, removing the sticky thin film from the rotating surface of the support, reducing the stickiness of the removed sticky thin film, and pulverizing the removed sticky thin film having the reduced stickiness;

wherein said method comprises a step of running the sticky thin film on a rotating surface of a cylinder and pressure sensitively adhering the sticky thin film onto the rotating surface of the cylinder by means of an auxiliary roll which changes a size of a clearance between itself and the rotating surface of the cylinder depending on a change in thickness of the sticky thin film.

14. The method of claim 13, wherein the rotating surface of the cylinder has been heated or cooled.

* * * * *